May 8, 1951   J. E. BEVINS ET AL   2,551,866
PAPER WINDING MECHANISM FOR RECORDING INSTRUMENTS
Filed April 16, 1945   3 Sheets-Sheet 1
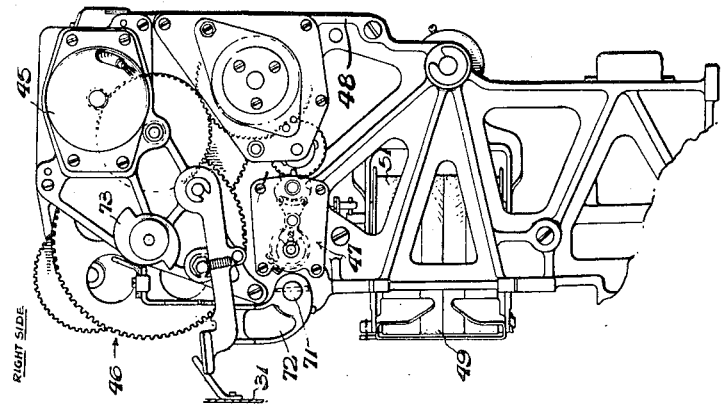
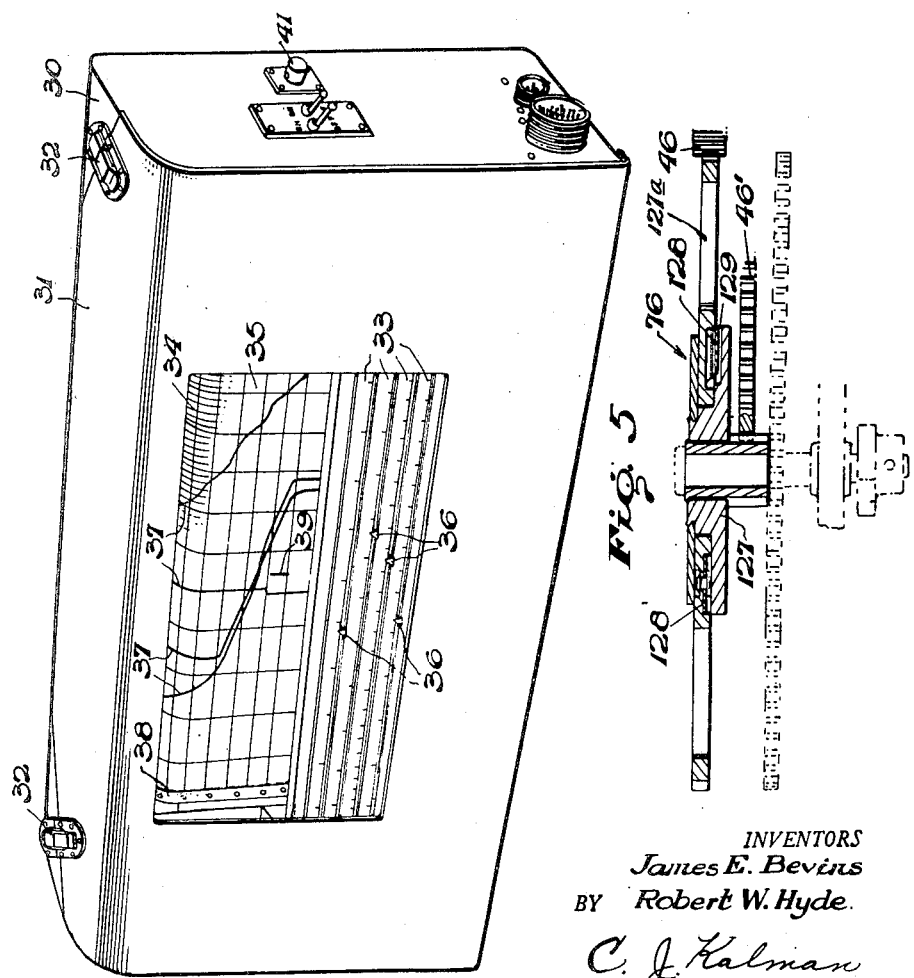
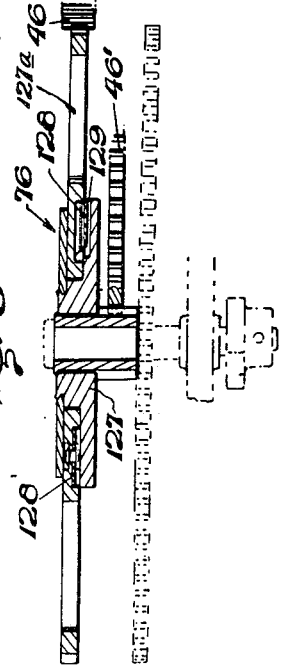
INVENTORS
James E. Bevins
Robert W. Hyde
BY
C. J. Kalman
ATTORNEY May 8, 1951  J. E. BEVINS ET AL  2,551,866
PAPER WINDING MECHANISM FOR RECORDING INSTRUMENTS
Filed April 16, 1945  3 Sheets-Sheet 2

INVENTORS
James E. Bevins
Robert W. Hyde
BY C. J. Kalman
ATTORNEY

Patented May 8, 1951

2,551,866

UNITED STATES PATENT OFFICE 2,551,866

PAPER WINDING MECHANISM FOR RECORDING INSTRUMENTS

James E. Bevins, Ramsey, and Robert W. Hyde, Englewood, N. J., assignors to Bendix Aviation Corporation, Teterboro, N. J., a corporation of Delaware Application April 16, 1945, Serial No. 588,600

5 Claims. (Cl. 242—55)

The invention relates generally to strip chart recording and/or indicating instruments, and more particularly to a novel chart winding mechanism therefor.

The present application has been divided and copending applications Serial Nos. 149,926 and 149,927 were filed on March 13, 1950.

The main object of the present invention is to provide novel chart re-roll mechanism for the used portion of the chart.

The invention contemplates a strip chart recorder having a chart driving roller for positively driving the chart at a substantially constant rate, and a re-roller in frictional engagement with a re-rolled portion of the chart and driven at a higher speed than the speed of the driving roller. A resiliently constrained arcuate clip encompasses to a large degree the re-rolled portion of the chart in cylindrical form and maintains the chart in frictional engagement with the re-roller. A tear-off bar may be provided between the roller and re-rollers to form a chute to the clips for the chart portion between the rollers and re-rollers. Also, an irreversible clutch may be provided for manually advancing the driving roller at a speed greater than its normal driving speed.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

In the drawings, Figure 1 is a perspective view of a novel recording instrument constructed according to the invention.

Figure 3 is an end view of the instrument partially in section.

Figure 5 is a detailed section of an irreversible clutch in the chart drive gearing.

Figure 2:
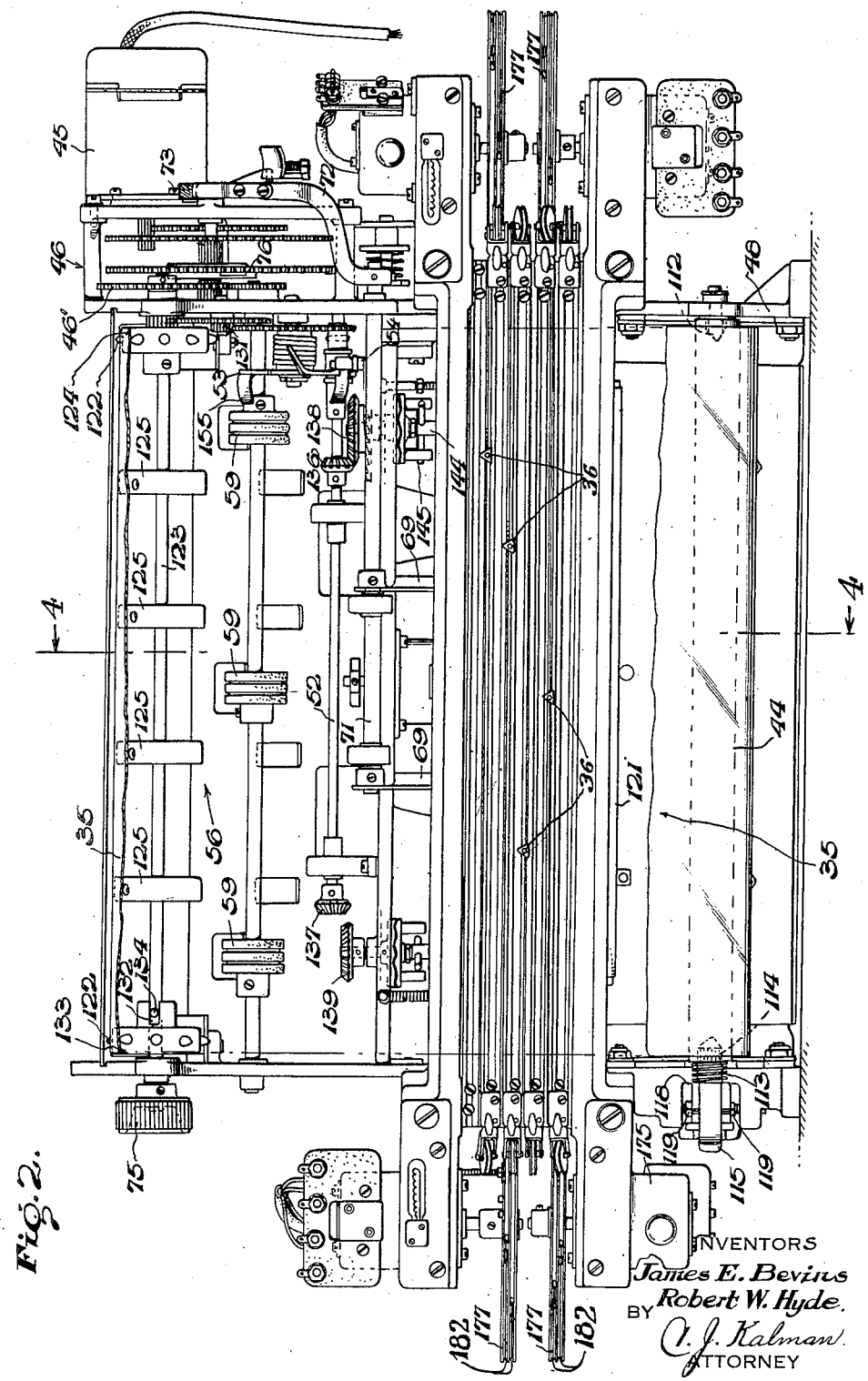
Figure 2 is a front elevation view of the instrument with the cover removed.

Referring now to the drawings for a more detailed description of the novel paper winding mechanism of the present invention, the mechanism is shown in Figure 1 as incorporated in a recording instrument having a casing 30 with a cover 31 which hooks to the bottom of the casing and is secured at the top of the casing by latches 32. The cover has a window 34 for viewing a plurality of fixed scales 33 and a section of a movable strip chart 35 on which is recorded values of the function being measured for a predetermined time interval. An index 36 for each scale 33 is mounted on a cord 182 on pulleys 177 (Fig. 2) and is moved by any suitable means lengthwise of the associated scale and transversely of the chart in response to a variable and indicates by lines 37 (Fig. 1) on the chart the instantaneous value of the variable. Marginal lines 38 (only one being visible in Figure 1) are recorded continuously to provide a reference independent of temperature or humidity effects on the chart. A reference mark 39 centrally of the chart is recorded when the operator presses a reference marker button 41.

Figure 4:
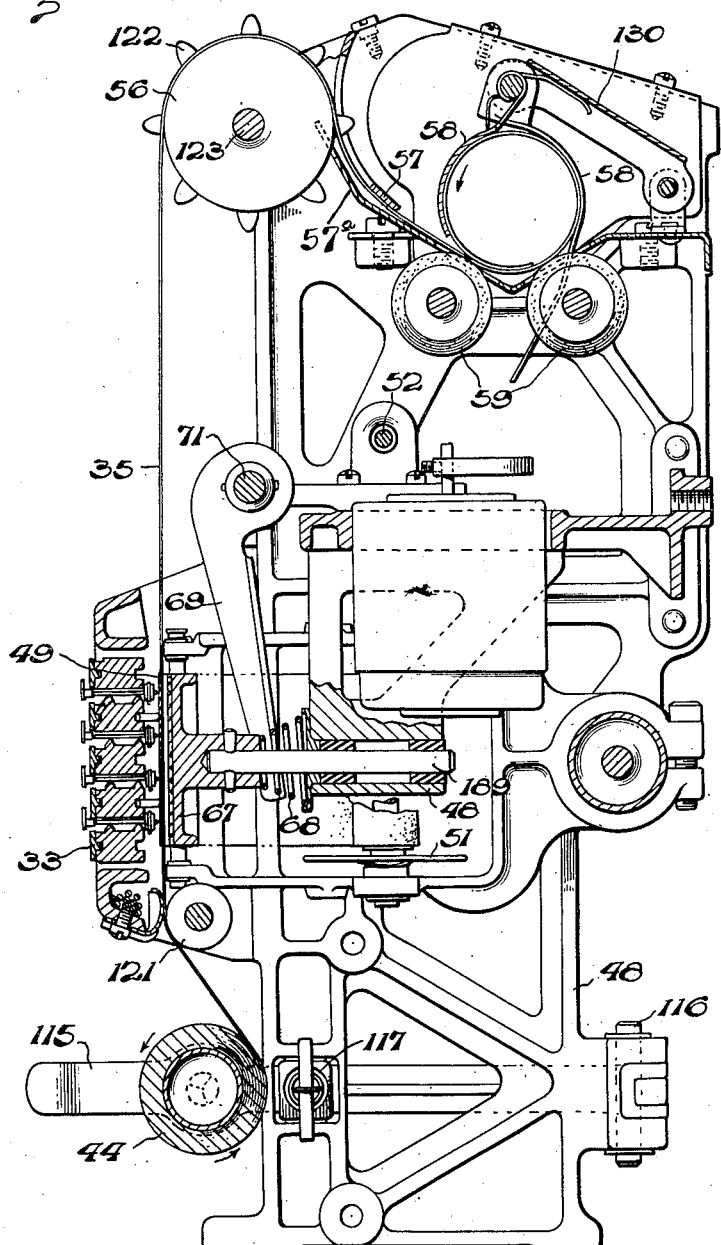
Figure 4 is a vertical section taken approximately on the lines 4—4 of Figure 2.

As shown in Figures 2, 3 and 4, a driving motor 45 at the upper portion of the instrument is connected by way of suitable gearing 46 with escapement differential mechanism 47 carried by a framework 48 to maintain the motor speed constant.

A multi-color inked ribbon 49 to the rear of scales 33 is wound on a pair of spaced parallel spools 51 driven by motor 45 through gearing 46 in one direction or the other relative to the strip chart. A horizontal rotatable cross-shaft 52 mounts gears 136 and 137 at its ends which cooperate with gears 138 and 139 drivingly connected to spools 51. A cam 53 effects periodic reversal of the ribbon by actuating a pivoted lever 54 to shift shaft 52 so that gear 136 engages gear 138 or so that gear 137 engages gear 139.

A platen 67 is secured to rods 189 slidable in bearings in framework 48. Springs 68, coaxial with rods 189, bias the platen toward the chart. A cross-shaft 71, rotatable on framework 48, has a pair of levers 69 depending therefrom and engaging platen 67. A lever 72 at one end of cross-shaft 71 is operated periodically by a timing cam 73 driven by motor 45. Platen 67 reciprocates to and away from the chart by operation of cam 73. The mechanism described briefly above is described and claimed in the above divisional applications.

The novel paper winding mechanism includes a chart feed roll 44 (Figs. 2 and 4) mounted on a stud 112 fixed in framework 48. A friction drag at the opposite end of the roll comprises a spring 113 engaging a grooved hub 114 which turns with the chart feed roll. The hub is rotatable on a lever 115 pivoted on a pin 116 attached to framework 48. A tension spring 117 biases lever 115 against a stop 118 of framework 48. A screw adjustment 119 on the framework provides for positioning the paper feed roll horizontally. The strip chart passes upwardly over an idler roller 121 rotatable on framework 48 and is threaded between ribbon 49 and platen 67, and then around a chart drive roller 56 rotatable on the framework 48. Roller 121 preferably is shorter than the width of the chart and is located centrally thereof. Chart driving roller 56 includes a shaft 123 rotatably supported by framework 48 and mounting a hub 124 fixed near one end of the shaft and a plurality of hubs 125 spaced lengthwise of the shaft. The opposite end of roller 56 has a hub 133 slidable axially on shaft 123 to accommodate changes in the width of the chart. The hub is restrained against rotation of shaft 123 by a pin 134 received in a slot 132 in hub 133. Hubs 124 and 133 have a plurality of chart engaging pins 122 received in spaced openings in the chart for driving the chart. Shaft 123 is driven at a constant speed by gearing 46 which includes an irreversible slip clutch generally designated by the reference character 76. The clutch permits the chart driving roller 56 to be turned in one direction only and at a speed greater than its normal driving speed, the drive being overpowered by manual operation of a knob 75 at the opposite end of the roller.

Shaft 123 is connected by gear 46' with a hub 127 (Figure 5) of the slip clutch 76. Springs 128 are connected to a clutch gear 127a and coact with notches 129 formed in the face of hub 127 adjacent the gear so that the springs exert a frictional effect during part of a revolution of gear 127a and act as pawls in cooperating with notches 129. Gear 131 connects shaft 123 with friction re-rollers 59 (Figs. 2 and 4) so that when shaft 123 is turned either manually by knob 75 or by motor 45, roller 56 and re-rollers 59 are rotated. Spring guides or clips 58 secured to framework 48 by levers 130 guide and hold the chart in a roll while it is being re-rolled by re-rollers 59. To the rear of drive roller 56 is a tear-off bar or strip 57 (Fig. 4) secured to framework 48 and a guide plate 57a which cooperates with the tear-off bar and forms a chute to clips 58 for the strip. The chart passes from drive roller 56 through the chute formed by tear-off bar 57 and guide plate 57a and is rolled within clips 58 as the outer circumference of the roll frictionally engages re-rollers 59.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. In a strip chart recorder having a chart driving roller for normally positively driving the chart at a substantially constant rate, the combination with said roller of a re-roller in frictional engagement with a re-rolled portion of the chart and driven at a higher speed than that of said driving roller, and two resiliently constrained arcuate clips encompassing to a large degree the re-rolled portion of the chart in a cylindrical form and maintaining the same in frictional engagement with said re-roller.

2. In a strip chart recorder having a chart driving roller for normally positively driving the chart at a substantially constant rate, the combination with said roller of a plurality of spaced re-rollers in frictional engagement with a re-rolled portion of the chart and driven in the same direction at a speed higher than that of said driving roller, and two resiliently constrained arcuate clips encompassing to a large degree the re-rolled portion of the chart in a cylindrical form and maintaining the same in frictional contact with said re-roller.

3. In a strip chart recorder having a chart driving roller for normally positively driving the chart at a substantially constant rate, the combination with said roller of a re-roller in frictional engagement with a re-rolled portion of the chart and driven at a higher speed than that of said driving roller, two resiliently constrained arcuate clips encompassing to a large degree the re-rolled portion of the chart in a cylindrical form and maintaining the same in frictional contact with said re-roller, and a tear-off bar between said rollers forming a chute to said clips for said chart portion therebetween.

4. In a strip chart recorder having a chart driving roller for normally positively driving the chart at a substantially constant rate, the combination with said roller of a re-roller in frictional engagement with a re-rolled portion of the chart and driven at a speed different from that of said driving roller, two resiliently constrained arcuate clips encompassing to a large degree the re-rolled portion of the chart in a cylindrical form and maintaining the same in frictional contact with said re-roller, and means comprising an irreversible clutch for manually advancing said driving roller at a speed greater than its normal driving speed.

5. In a strip chart recorder having a chart driving roller for normally positively driving the chart at a substantially constant rate, the combination with said roller of two spaced re-rollers in frictional engagement with the re-rolled portion of the chart and driven in the same direction at a speed higher than that of said driving roller, a lever, and two resiliently constrained clips on said lever encompassing to a greater degree the re-rolled portion of the chart in a cylindrical form and maintaining the same in frictional engagement with said re-rollers.

JAMES E. BEVINS.
ROBERT W. HYDE.

REFERENCES CITED

The following references are of record in the file of this patent:

UNITED STATES PATENTS

| Number | Name | Date |
|---|---|---|
| 446,886 | Pusey | Feb. 24, 1891 |
| 798,241 | Warren | Aug. 29, 1905 |
| 866,064 | Pollock | Sept. 17, 1907 |
| 997,075 | Menns | July 4, 1911 |
| 1,081,933 | Waring | Dec. 16, 1913 |
| 1,310,195 | Lockwood | July 15, 1919 |
| 1,316,657 | White et al. | Sept. 23, 1919 |
| 1,492,559 | Ewing | May 6, 1924 |
| 1,564,560 | Grisdale | Dec. 8, 1925 |
| 1,706,046 | Tisdale | Mar. 19, 1929 |
| 1,707,286 | Stickney | Apr. 2, 1929 |
| 1,812,083 | Damerell | June 30, 1931 |
| 1,948,416 | Eccles | Feb. 20, 1934 |
| 2,062,570 | Fuller | Dec. 1, 1936 |
| 2,212,140 | Ferris | Aug. 20, 1940 |
| 2,267,886 | Anderson | Dec. 30, 1941 |
| 2,268,891 | Mueller | Jan. 6, 1942 |
| 2,312,336 | Holliday | Mar. 2, 1943 |
| 2,329,130 | Nelson | Sept. 7, 1943 |
| 2,368,300 | Heist | Jan. 30, 1945 |
| 2,378,294 | Field et al. | June 12, 1945 |
| 2,393,471 | Johnson | Jan. 22, 1946 |